C. NULL & E. A. BAKER.
CLUTCH ACTUATING MEANS.
APPLICATION FILED APR. 28, 1914.
1,217,624.
Patented Feb. 27, 1917.
2 SHEETS—SHEET 1.
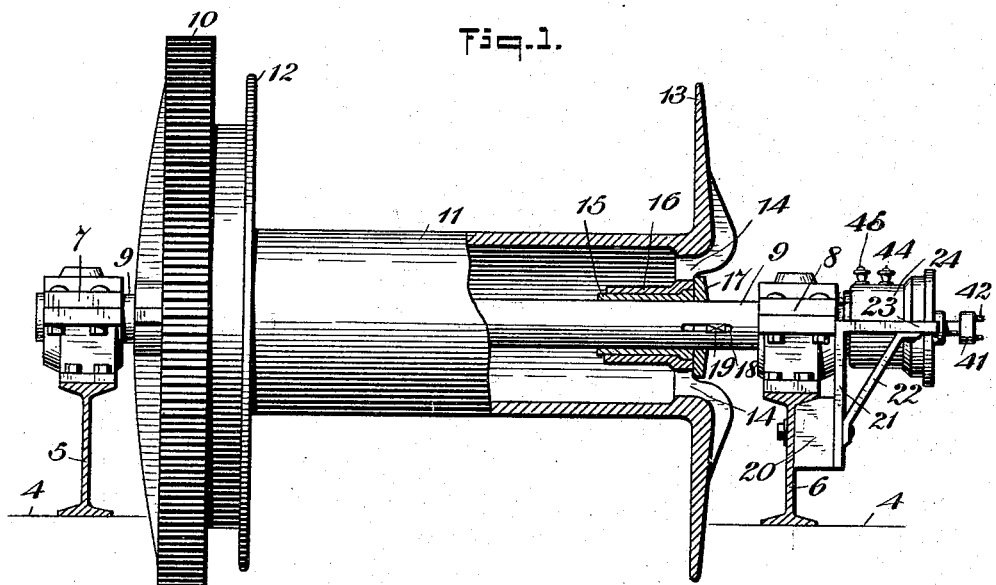
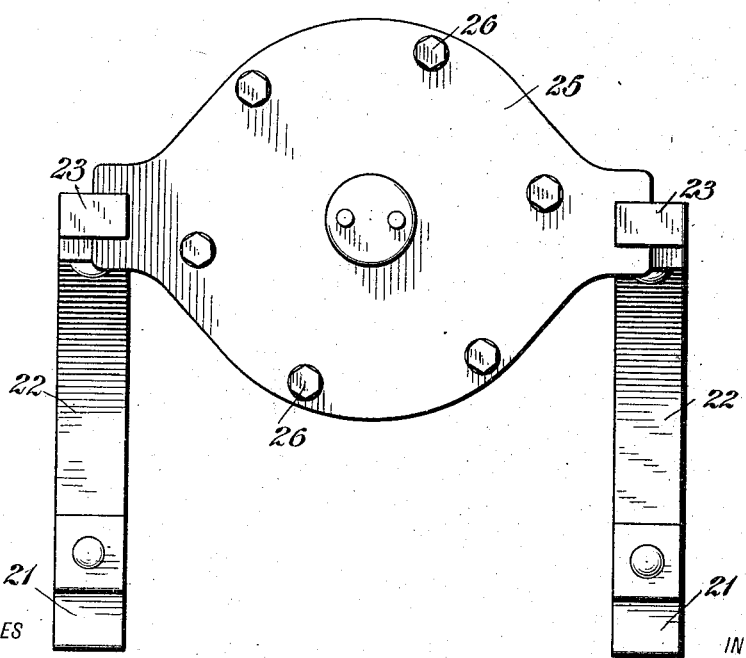
WITNESSES
INVENTORS
Claude Null
Ernest A. Baker
BY
ATTORNEYS

C. NULL & E. A. BAKER.
CLUTCH ACTUATING MEANS.
APPLICATION FILED APR. 28, 1914.

1,217,624.

Patented Feb. 27, 1917.
2 SHEETS—SHEET 2.

WITNESSES

INVENTORS
Claude Null
Ernest A. Baker
BY
ATTORNEYS

UNITED STATES PATENT OFFICE.

CLAUDE NULL AND ERNEST A. BAKER, OF ROCHESTER, WASHINGTON.

CLUTCH-ACTUATING MEANS.

1,217,624. Specification of Letters Patent. Patented Feb. 27, 1917.

Application filed April 28, 1914. Serial No. 834,928.

*To all whom it may concern:*

Be it known that we, CLAUDE NULL and ERNEST A. BAKER, both citizens of the United States, residing at Rochester, in the county of Thurston and State of Washington, have invented certain new and useful Improvements in Clutch-Actuating Means, of which the following is a specification.

Our invention relates to friction heads of the type used, for instance, upon logging and hoisting engines, our more particular purpose being to provide means for relieving the friction due to end-thrust of the hoisting drum, and also to distribute the strains due to such end-thrust, as well as to protect various parts from undue wear and breakage.

More particularly stated, we employ a special type of end-thrust bearing, provided with ball races, and so formed as to be especially adapted for the purposes above indicated.

Reference is made to the accompanying drawings forming a part of this specification, and in which like letters indicate like parts.

Figure 1 is a view, partly in front elevation and partly in vertical section, showing a hoisting drum with our improved friction head used in connection therewith.

Fig. 3 is a vertical longitudinal section through the friction head and parts immediately adjacent thereto.

Figure 2:
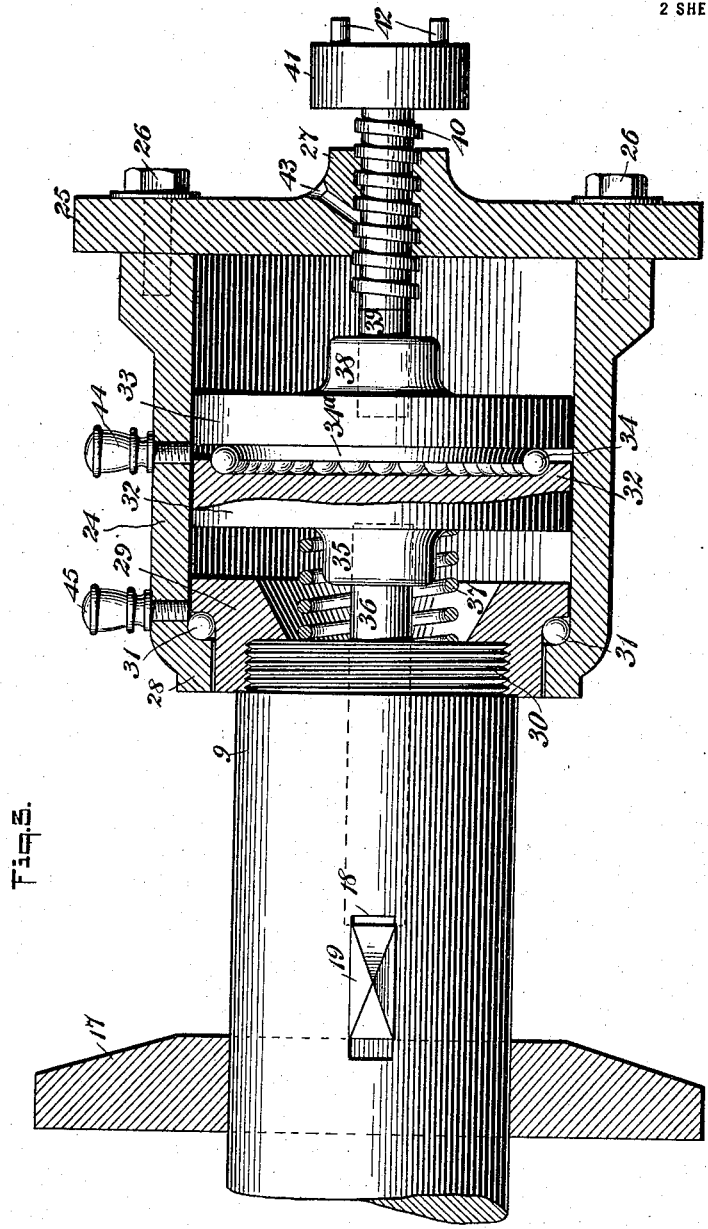
Fig. 2 is a side elevation, on a scale considerably larger than in Fig. 1, showing the friction head and its mountings.

Mounted upon a platform 4 are a pair of metallic beams 5, 6, and secured upon the latter are bearings 7, 8. Extending through these bearings and supported thereby is a revoluble shaft 9, which carries a rack wheel 10 and a hoisting drum 11, this drum having two spool ends 12, 13, and a spider 14.

Shrunken upon the shaft 9 is a sleeve 15, and encircling the latter is a sleeve 16, carried by the spider 14. A disk 17 of annular form encircles the shaft 9, and is held in position by a cotter pin 19, the latter extending through a slot 18 in the shaft 9.

Mounted rigidly upon the beam 6 is a block 20, which carries a pair of brackets 21, each of subtantially L-shape and having a brace 22 whereby it is strengthened. Each bracket 21 is further provided with a top portion 23. Located between these top portions and secured firmly thereto is a casing 24, having a substantially cylindrical form as indicated more particularly in Fig. 3.

The casing 24 is provided with a removable head 25, held in position upon it by bolts 26. The casing head 25 is provided with a centrally disposed massive portion 27. The casing 24, at its end opposite its casing head 25, is provided with a contracted annular portion 28.

Located loosely within one end of the casing 24 is a collar 29, which is secured by a thread 30 to the adjacent end of the shaft 9, and engages a number of balls 31, the latter also engaging the adjacent inner surface of the casing 24, in such manner as to constitute a ball bearing. By virtue of this ball bearing the collar 29 is unable to move to the left, according to Fig. 3. Located within the casing 24 are two disks 32, 33, and between these disks are a number of balls 34, arranged in a circular ball race 34$^a$, and constituting therewith a ball bearing.

The disks 32, 33 fit loosely but neatly into the casing. The disk 32 carries a socket 35, and extending loosely into the latter is a pin 36, carried by the shaft 9 and revoluble therewith, and which engages the cotter 19.

A compression spring 37, of spiral form, encircles the pin 36 and the socket 35, and bears against the disk 32 and adjacent end of the shaft 9.

The disk 33 carries a socket 38, and fitting loosely within this socket is a boss 39. Extending through the massive portion 27 of the casing head 25 is a feed screw 40, which carries a disk 41, rigid relatively to it and used for actuating it, for purposes of adjustment. The disk 41 carries a pair of spanner pins 42, by aid whereof it may be turned in order to advance or retract the feed screw 40.

The casing head 25 is provided with an oil hole 43. The casing 24 carries a pair of oil cups 44, 45, which communicate with the respective ball bearings above described, and as indicated in Fig. 3.

The parts are so arranged that the spring 37, by forcing the disk 32 to the right according to Fig. 3, maintains the disks 32 and 33 in proper working relation, so that the balls 34 are unable to work loose or to drop down in the event that there happens to be room for them to do so.

The spring 37 also maintains the balls 31 in proper working relation to the parts engaging them, so that any undue looseness is thus taken up, and lost motion is thus prevented.

The operation of our device is as follows:

The parts being formed, assembled and arranged as above described, the casing is filled with oil, or at least an adequate supply of oil is injected into the casing, and the oil cups 44, 45 and the oil hole 43 are also filled.

A hand lever is applied to the disk 41 for the purpose of turning the same and thus adjusting the screw 40.

Power being applied, the shaft 9 rotates, carrying with it the collar 29, the pins 36 and 39 are free to rotate or not, according to the amount of friction upon them. The ball bearing takes up the end-thrust and at the same time, owing to the small amount of friction present, relieves the pins of the necessity of rotating. By this arrangement the wear upon the pins is reduced to a minimum.

The drum 11 (Fig. 1) fits loosely on shaft 9 and the shaft is rotated by spur 10; when it is desired to engage the clutch a hand lever is clamped to 41 and the screw 40 is moved longitudinally in the direction required to bring the end of said screw 40 forcibly against pin 39 (Fig. 3) thereby transmitting the longitudinal movement through disks 33 and 32, balls 34 and thrust pin 36, and gib 19 to the drum thereby forcing the drum into contact with the usual friction clutch on spur 10.

The device is so arranged as to relieve the frame work of the machine of undue strain, the mechanism being practically independent of the frame work, which is used merely to support the weight of the friction head.

If owing to wear or other cause the parts adjacent the ball bearing last mentioned become loose, a wrench is applied to the spanner pins 42, the disk 41 is rotated, and the feed screw 40 is slightly advanced. This causes the disk 33 to move slightly toward the left according to Fig. 3, so that the ball bearing between the disks 32 and 33 forms the medium of connection between said disks.

The tendency of the spring 37 is also to cause both of the ball bearings to be maintained in proper relation to other working parts.

By the arrangement above described, the end-thrust is received upon the disk 33, and if the shaft 9 be for any reason moved to the left according to Fig. 3, the ball bearing comprising the balls 31 receives the resulting end-thrust to the left according to this figure. All strain due to end-thrust is therefore borne by parts built for the purpose of sustaining it, and breakage and undue wear are thus prevented.

We do not limit ourselves to the precise construction shown, as variations may be made therein without departing from the spirit of our invention.

Having thus described our invention, what we claim as new and desire to secure by Letters Patent is as follows:

1. In a device of the character described, the combination with a cylindrical casing having a contracted opening at one end, a collar revolubly mounted within said casing and projecting into said contracted opening, a revoluble shaft adjustably connected to said collar, a ball bearing between said collar and the contracted portion of the casing, a disk revolubly and slidably supported within and by said casing and adjacent said collar, means mounted for longitudinal movement within the shaft and connected at one end to said disk, expansible means between said disk and shaft, a second disk revolubly and slidably supported in said casing, a ball bearing interposed between the said disks permitting their independent rotation, means longitudinally shiftable on the shaft and subject to end thrust in operation to move the means mounted within the shaft, and means for adjusting said disks relatively to the said collar.

2. A device of the character described comprising a cylindrical casing, a casing head closing one end thereof, a revoluble collar in the opposite end of the casing, a revoluble shaft connected to said collar for rotating the same, a pin axially carried in one end of the shaft, and mounted for longitudinal movement therein, a disk revolubly mounted in said casing having a recessed central boss loosely engaging the free end of the pin, a spring encircling said boss and engaging at its ends the shaft and one face of said disk respectively, the opposite face of said disk having a ball raceway, a second disk revolubly carried in the casing and having the face opposing the said first disk provided with a ball race-way, bearing balls located in said raceways, means longitudinally shiftable on the shaft and subject to end thrust to move the aforesaid pin, and movable means interposed between the opposite face of the said disk and the head of the casing for adjusting said second disk toward the first disk, whereby end thrust on the second disk reacts on the casing.

3. A device of the character described comprising a casing of substantially cylindrical form, a casing head closing one end of said casing, a feed screw extending through said casing head, a revoluble collar constituting a partial closure for the opposite end of the casing, a revoluble shaft adjustably connected to said collar, an axial pin loosely mounted in one end of said shaft, means longitudinally shiftable on said shaft and subject to end thrust to move said axial pin, a disk revolubly mounted in said casing and having a centrally recessed boss on its face toward the shaft, said axial pin slidably engaging said boss, a spring encircling said boss and engaging at its ends, said disk and shaft, a second disk revolubly mounted in the casing toward the casing head, a circular series of balls interposed between said disks and engaging the opposing faces thereof, and means for rotating the feed screw, whereby end thrusts are counterbalanced and taken by the casing.

In testimony whereof we have signed our names to this specification in the presence of two subscribing witnesses.

CLAUDE NULL.
ERNEST A. BAKER.

Witnesses:
ROBT. M. PATON,
GEO. S. WOOD.

Copies of this patent may be obtained for five cents each, by addressing the "Commissioner of Patents, Washington, D. C."